A. HENDRICKS.
METALLIC MIRROR PANEL.
APPLICATION FILED AUG. 21, 1911.
1,027,540.
Patented May 28, 1912.
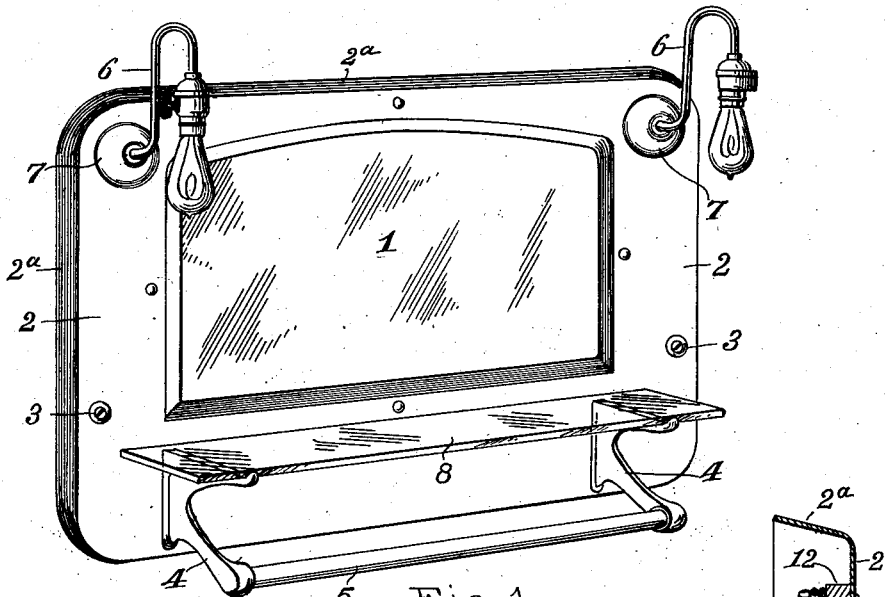
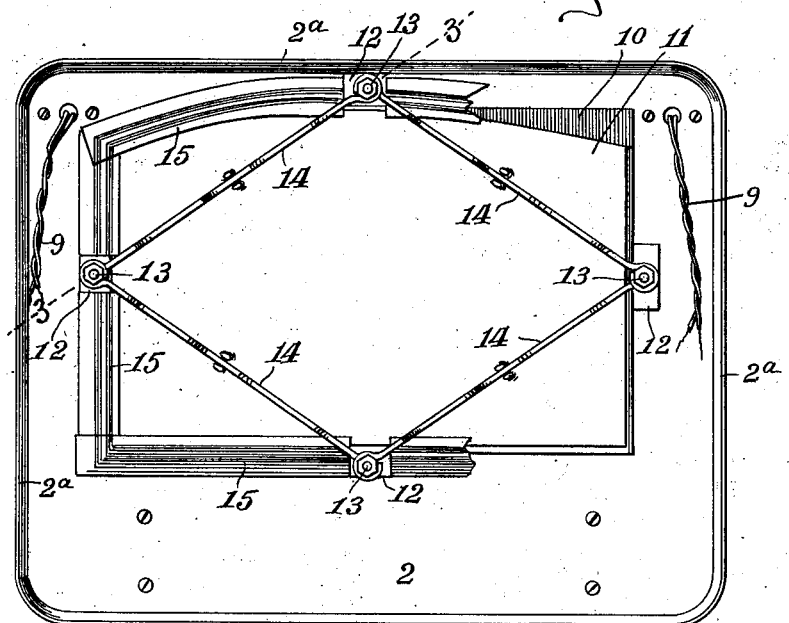
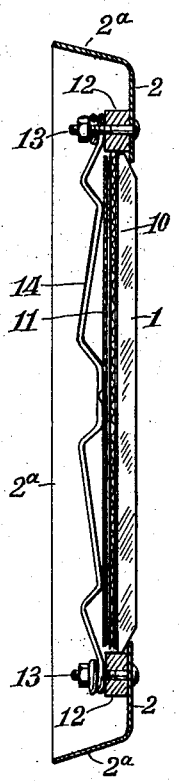
Witnesses
Harold O. Van Antwerp
Anna De Windt
Inventor
Augustin Hendricks
By Luther V. Moulton
Attorney

UNITED STATES PATENT OFFICE.

AUGUSTIN HENDRICKS, OF GRAND RAPIDS, MICHIGAN.

METALLIC MIRROR-PANEL.

1,027,540.                   Specification of Letters Patent.      Patented May 28, 1912.

Application filed August 21, 1911. Serial No. 645,222.

*To all whom it may concern:*

Be it known that I, AUGUSTIN HENDRICKS, a citizen of the United States of America, residing at Grand Rapids, in the county of Kent and State of Michigan, have invented certain new and useful Improvements in Metallic Mirror-Panels; and I do hereby declare the following to be a full, clear, and exact description of the invention, such as will enable others skilled in the art to which it appertains to make and use the same.

My invention relates to improvements in metallic mirror panels and its object is to provide the same with improved means for detachably securing the mirror in the same; to provide an improved metallic panel for the mirror; and to provide the same with various new and useful features hereinafter more fully described and particularly pointed out in the claims reference being had to the accompanying drawings, in which:—

Figure 1 is a perspective of a device embodying my invention; Fig. 2 a rear elevation of the same; and Fig. 3 an enlarged section on the line 3—3 of Fig. 2.

Like numbers refer to like parts in all of the figures.

1 represents a mirror preferably of beveled plate glass and of any convenient dimensions; 2 a stamped sheet metal panel having an opening slightly smaller than the dimensions of the mirror and also provided with a rearwardly pressed margin 2ª of sufficient depth to form a chamber when placed against a wall, to contain the means for securing the mirror in place and to effectually protect the back of the mirror from access of moisture or gases which tend to injure the same. This panel is conveniently secured to a wall by means of screws and washers 3.

At the front below the mirror is attached cast metal brackets 4 having arms projecting outward and downward provided with sockets adapted to support a glass rod 5 to serve as a towel rack, and a glass shelf 8 detachably rests on the top of the said brackets in horizontal position.

6 are tubular electric light brackets provided with collars 7 detachably secured to the face of the panel and having the proper electric wires for the lights extending therethrough through openings in the panel, and within the chamber at the back of the same whereby said wires may be connected up to conductors through any suitable opening in the wall at the rear of the panel.

The mirror plate 1 is provided with a backing 10 preferably corrugated paper or other yieldable material and back of this backing is a metallic plate 11 pressed against the paper by means of resilient wires or rods 14 bent to engage the plate at intervals whereby they operate as springs to yieldably press the plate against the paper and thus securely hold the mirror in place. These wires are preferably arranged as in Fig. 2 extending diagonally across the back of the mirror to studs 13 which are fixed in the panel opposite the middle of each side of the mirror and extend through eyes in the ends of the wires 14. To adjust the mirror in place and solidly secure the ends of the wires blocks 12 are placed at each of the four sides of the mirror through which the said studs also extend, the wires being bound firmly against these blocks by means of nuts on the studs. The blocks engaging each of the four sides of the mirror adjust the same properly in place opposite the opening in the front of the panel. When the mirror is thus secured in place, I prefer also to paste strips of paper 15 over the edges of the mirror, backing paper and plate as shown in Fig. 2. By this mechanism the mirror is securely held in place and cannot be shifted in position by handling; is fully protected from moisture and gases; and is readily detached at any time, by taking the nuts from the studs and removing the wires or rods 14. It will also be noted that the brackets are all secured by screws inserted from the back through the panel opposite the bracket whereby the brackets cover the openings and no fastenings are visible from the front, thus insuring an air tight structure and a smooth finish easily kept clean and sanitary.

What I claim is:—

1. A mirror panel of stamped sheet metal having a front opening, rearwardly pressed margins to the panel to engage a wall and form a closed chamber behind the mirror, a mirror in said opening, a yieldable backing for the mirror, a metal plate behind the backing, resilient rods or wires engaging the plate and studs in the panel to which the rods or wires are detachably secured.

2. A mirror panel of stamped sheet metal having a front opening, a mirror in said opening, rearwardly pressed margins to the panel, studs fixed in the panel at the respective sides of said opening, blocks on said studs to engage the edge of the mirror to locate the same, a yieldable backing and a plate at the rear of said mirror, wires or rods bent to yieldably engage the plate at intervals and having end eyes to receive the studs and removable nuts on the studs to engage the eyes.

3. In combination with a panel and a mirror therein, rearwardly projecting studs in the panel at the respective sides of the mirror, blocks on the studs to engage the respective edges of the mirror, a backing plate for the mirror, resilient rods or wires having eyes to receive the studs and laterally engaging the backing and removable nuts on the studs to engage the eyes and hold the wires against the backing.

In testimony whereof I affix my signature in presence of two witnesses.

AUGUSTIN HENDRICKS.

Witnesses:
HAROLD O. VAN ANTWERP,
L. V. MOULTON.

Copies of this patent may be obtained for five cents each, by addressing the "Commissioner of Patents, Washington, D. C."